United States Patent [19]

Satoh

[11] Patent Number: 5,784,207

[45] Date of Patent: Jul. 21, 1998

[54] MECHANISM FOR EYE CONTACT ELEMENT OF OPTICAL DEVICE

[75] Inventor: Akira Satoh, Tokyo, Japan

[73] Assignee: Nikon Corporation, Tokyo, Japan

[21] Appl. No.: 756,431

[22] Filed: Nov. 26, 1996

[30] Foreign Application Priority Data

Feb. 15, 1996 [JP] Japan ................................ 8-027994

[51] Int. Cl.⁶ .................................................. G02B 15/14
[52] U.S. Cl. ........................................ 359/700; 359/701
[58] Field of Search ............................... 359/699, 700, 359/701, 702, 703, 704, 705, 706, 823, 825, 826, 829, 830

[56] References Cited

U.S. PATENT DOCUMENTS

| 3,897,998 | 8/1975 | Someya et al. | 359/699 |
|---|---|---|---|
| 4,346,967 | 8/1982 | Komoto et al. | 359/699 |
| 4,380,378 | 4/1983 | Tamura | 359/699 |
| 4,428,651 | 1/1984 | Calcutt | 350/556 |
| 4,576,446 | 3/1986 | Kamata | 359/699 |
| 5,020,892 | 6/1991 | Glover et al. | 350/537 |
| 5,212,595 | 5/1993 | Dennison, Jr. et al. | 359/513 |
| 5,477,387 | 12/1995 | Takayama | 359/702 |
| 5,576,892 | 11/1996 | Hotta et al. | 359/696 |

*Primary Examiner*—Frank G. Font
*Assistant Examiner*—Michael P. Stafira

[57] ABSTRACT

A mechanism for the eye contact element of an optical device in which a cylindrical eye contact element is slidably engaged with an eyepiece holding barrel containing an eyepiece therein has a guide mechanism for shifting the eye contact element in the direction of the optical axis of the eyepiece with the rotation of the eye contact element about the optical axis when the eye contact element is rotatively operated, and a holding mechanism for holding the eye contact element at any shifted position.

19 Claims, 7 Drawing Sheets

1

MECHANISM FOR EYE CONTACT ELEMENT OF OPTICAL DEVICE

BACKGROUND OF THE INVENTION

1. Field of the Invention

This invention relates to a mechanism for an eye contact element of an optical device such as binoculars or a telescope in which a cylindrical eye contact element is slidably fitted to an eyepiece holding cylinder containing an eyepiece therein.

2. Related Background Art

In some optical devices, a cylindrical eye contact element to which an observer applies his or her eye when he or she looks into an eyepiece is mounted on an eyepiece holding cylinder containing an eyepiece therein. The eye contact element is usually formed of an elastic material such as rubber, and the observer looks into the eyepiece while applying it around his or her eye. On the other hand, this eye contact element often becomes a hindrance to an observer wearing a pair of spectacles. In such cases, the eye contact element is turned over to the body side and observation is done in this state.

Examples of the prior art improving a mechanism for the eye contact element of such construction are described, for example, in Japanese Utility Model Publication No. 6-6328 and Japanese Laid-Open Patent Application No. 7-43616. Japanese Utility Model Publication No. 6-6328 discloses a snap mechanism for holding an eye cup slidable in the direction of an optical axis at a predetermined position. Also, in Japanese Laid-Open Patent Application No. 7-43616, an eye cup slidably mounted on an eye contact portion is biased in the direction opposite to an observer by a spring to be brought into a normal state, and during use, the eye cup is pulled out and fixed at a predetermined position.

Observers using optical devices include ones wearing spectacles as previously described and ones not wearing spectacles, and in any case, no observer can look out over the whole field of view unless he or she looks into an eyepiece with his or her pupil positioned at a proper eye point.

In the aforedescribed prior art, however, the position of the eye cup can be adjusted only stepwise, and not everybody could make an observation at a proper eye point.

SUMMARY OF THE INVENTION

In view of such a problem, the present invention has as an object to provide a mechanism for an eye contact element of an optical device which can finely adjust the position of the eye contact element in the direction of the optical axis thereof.

In order to achieve the above object, the mechanism for the eye contact element according to the present invention is a mechanism for the eye contact element of an optical device in which a cylindrical eye contact element is slidably fitted to an eyepiece holding barrel containing an eyepiece therein, including:

a guide mechanism for shifting the eye contact element in the direction of the optical axis of the eyepiece with the rotation of the eye contact element about the optical axis when the eye contact element is rotatively operated; and a position holding mechanism for holding the eye contact element at any shifted position in the guide direction of the guide mechanism.

The guide mechanism may be, for example, a cam mechanism having a cam pin provided on one of the eyepiece

2 holding barrel and the eye contact element, and a cam slot provided in the other of the eyepiece holding barrel and the eye contact element and in which the cam pin is inserted. In this case, if the cam slot is formed spirally about the optical axis and the guide amount of the eye contact element in the direction of the optical axis per predetermined rotative operation angle is smaller near the end portion of the cam slot than near the center of the cam slot, the fine adjustment of the eye contact element near the end portion of the cam slot will become easy to do.

Also, a resilient member slidably contacting with the inner peripheral surface of the eye contact element may be mounted on the eyepiece holding barrel, and an engagement groove engaged by the resilient member when the cam pin is positioned near the end portion of the cam slot may be formed in the inner peripheral surface of the eye contact element, and these may provide the position holding mechanism.

DESCRIPTION OF THE PREFERRED EMBODIMENTS

An embodiment of a mechanism for an eye contact element of an optical device such as binoculars or a telescope according to the present invention will hereinafter be described with reference to the drawings.

Figure 1:
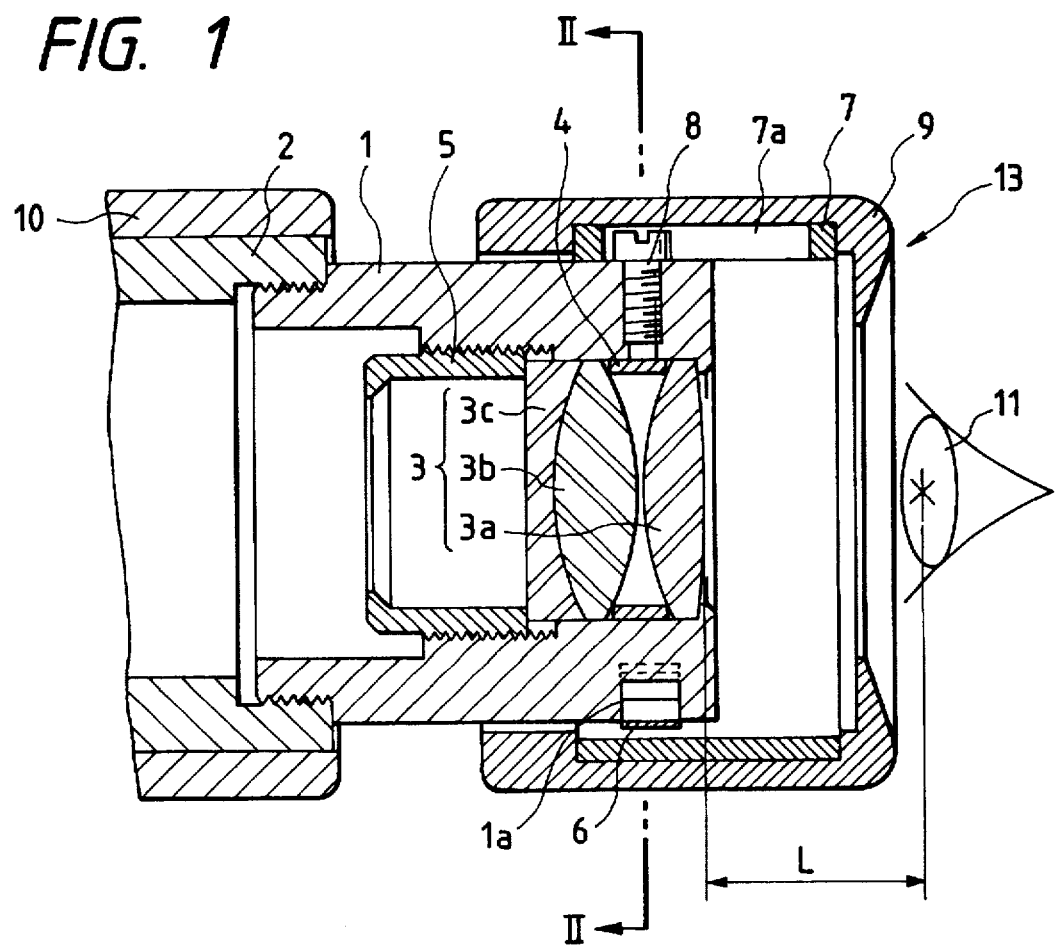
FIG. 1 is a cross-sectional view of the portion around an eye contact element in an embodiment of the present invention when the eye contact element is set at a standard position for observers not wearing spectacles.
Figure 2:
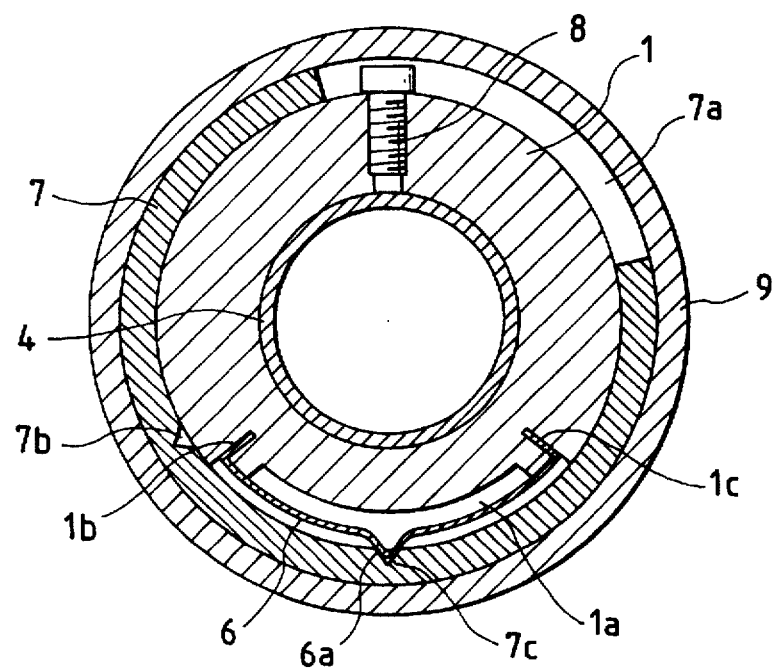
FIG. 2 is a cross-sectional view taken along the line II—II of FIG. 1.

In FIG. 1, there is shown the state of a cross-section of the eye contact portion of the optical device in the present embodiment and the position of an observer's eye. In FIG. 2, there is shown the state of a cross-section along the line II—II of FIG. 1.

An eyepiece holding barrel 1 is a cylindrical member having one end portion screwed into an optical device body 2. An eyepiece 3 comprising three lenses $3a$, $3b$ and $3c$ is contained in the eyepiece holding barrel 1. Between the lens $3a$ nearest to an observer's eye 11 and the lens $3b$ located adjacent thereto, there is disposed a spacing ring 4 which defines the spacing between these two lenses. The lenses $3a$–$3c$ are held down by a holding-down ring 5 with the spacing ring 4, and in this state, they are aligned in the direction of the optical axis thereof without any backlash. The optical device body 2 is covered with a body cover 10.

An eye contact element 13 is slidably fitted to the outer periphery of the eyepiece holding barrel 1. The eye contact element 13 comprises an external barrel 7 and an eye cup 9. Thus, specifically, the external barrel 7 is slidably fitted to the outer periphery of the eyepiece holding barrel 1, and the eye cup 9 made of rubber is mounted on the outer periphery of the external barrel 7. The eye cup 9 is partially secured to the external barrel 7 by an adhesive agent.

A cam pin 8 is provided on the side portion of the eyepiece holding barrel 1. The head of the cam pin 8 is inserted in a cam slot $7a$ formed in the external barrel 7. The cam slot $7a$ is formed spirally about the optical axis.

Figure 3:
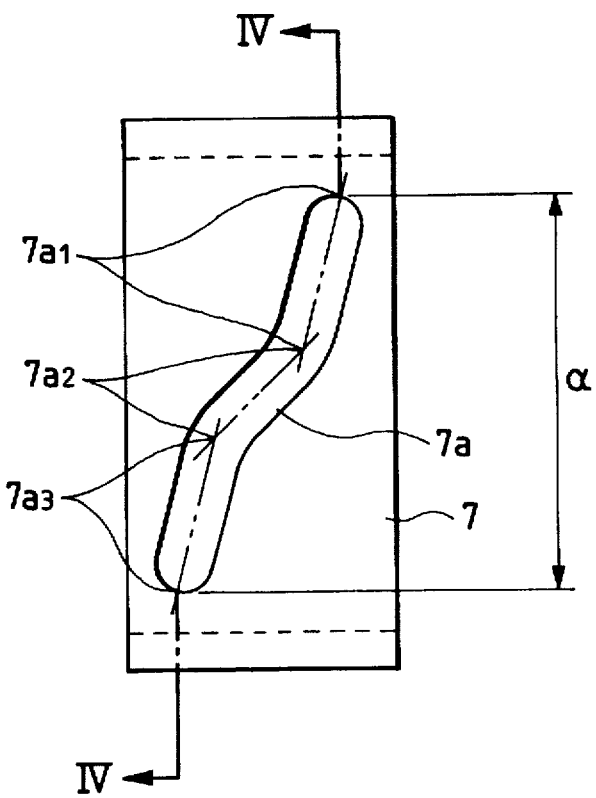
FIG. 3 is a side view of the external barrel of FIG. 1.
Figure 4:
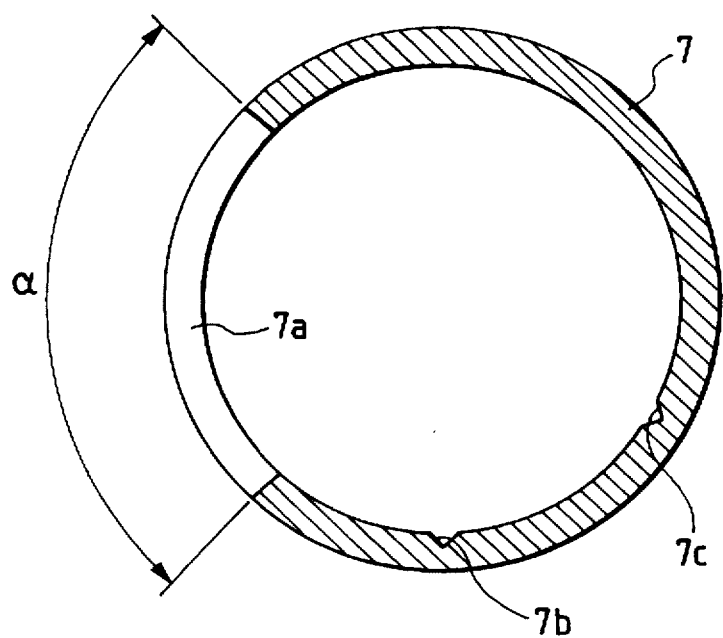
FIG. 4 is a cross-sectional view taken along the line IV—IV of FIG. 3.

FIG. 3 is a side view of the external barrel 7. FIG. 4 is a cross-sectional view of the external barrel 7 of FIG. 3 taken along the line IV—IV. As shown in these two figures, the cam slot $7a$ is formed so that the guide amount of the eye contact element 13 in the direction of the optical axis per predetermined operation angle may be smaller near the end portion of the cam slot $7a$ than near the center of the cam slot $7a$. Describing on the basis of the cam slot $7a$ shown in FIG. 3, i.e., the actual cam slot $7a$ as it is seen in a plan view, the sections $7a_1$ and $7a_3$ of the cam slot $7a$ are formed so as to become parallel to each other, and the section $7a_2$ of the cam slot is formed so as to be more steeply inclined than the section $7a_1$ ($7a_3$). The angle (the rotative operation angle $\alpha$ of FIG. 4) by which the eye contact element 13 can be rotated is determined with the operability or the like of the eye contact element 13 taken into account.

Also, the eyepiece holding barrel 1 is provided with a circumferential groove $1a$ formed circumferentially by a predetermined angle. Slit grooves $1b$ and $1c$ are formed on the opposite sides of the circumferential groove $1a$. A leaf spring 6 is a plate-like resilient member having its opposite end portions bent, and is fixed within the circumferential groove $1a$ with the opposite end portions fitted in the slit grooves $1b$ and $1c$. Two engagement grooves $7b$ and $7c$ extending in the direction of the optical axis are formed in the inner periphery of the external barrel 7. The engagement groove $7c$ is a v-groove formed to define the standard position of the eye contact element 13 for observers not wearing spectacles. The engagement groove $7b$ is a v-groove formed to define the standard position of the eye contact element 13 for observers wearing spectacles. The central portion of the leaf spring 6 protrudes outwardly, and this projected portion $6a$ falls in the engagement groove $7c$. The projected portion $6a$ is biased toward the external barrel 7 side by the spring action of the leaf spring 6 and thus, the detention of the eye contact element 13 is done by the engagement between the projected portion $6a$ and the engagement groove $7c$.

The letter L in FIG. 1 designates an eye relief in optical design. The eye relief indicates the distance between the last optical surface (the outer side surface of the lens $3a$) and the exit pupil of an observation optical system, and when an observer looks into the eyepiece at that position (eye point) of FIG. 1, the observer can look out over the whole field of view. The eye relief is long or short depending on the construction (the number of lenses, diameter, etc.) of the eyepiece.

When the optical device having the above-described construction is used, an observer not wearing a pair of spectacles brings the projected portion $6a$ of the leaf spring 6 into engagement with the engagement groove $7c$ of the external barrel 7, sets the eye contact element 13 at a position as shown in FIG. 1, and makes desired observation while applying the eye cup 9 to around his or her eye.

Figure 5:
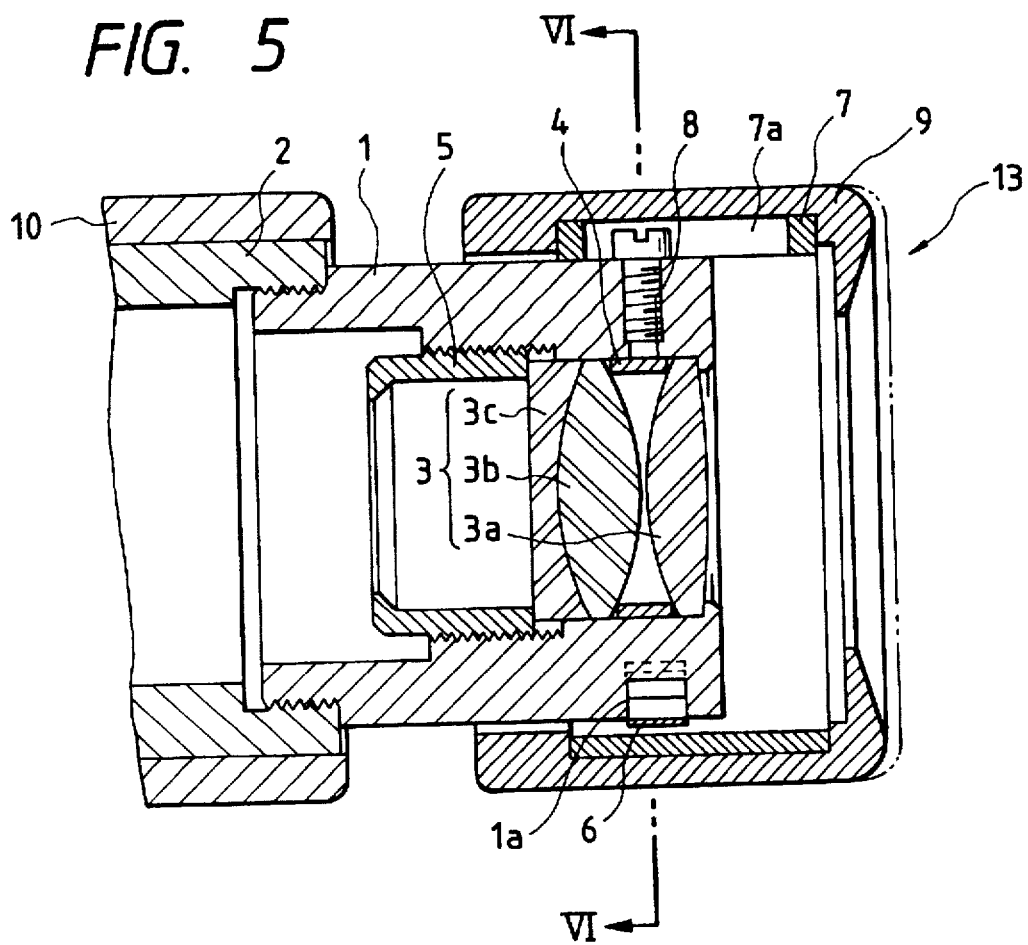
FIG. 5 is a cross-sectional view of the portion around an eye contact element in the embodiment of the present invention when the eye contact element is set near the standard position for observers not wearing spectacles.
Figure 6:
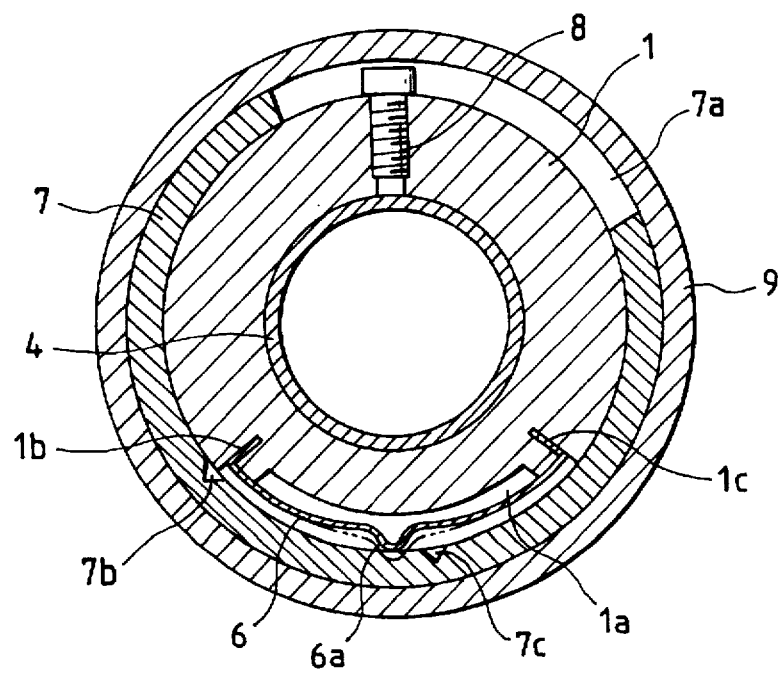
FIG. 6 is a cross-sectional view taken along the line VI—VI of FIG. 5.

The position of the eye contact element 13 of FIG. 1 is set so as to generally match observers not wearing spectacles, but this position is merely a standard one. Accordingly, among the observers not wearing spectacles, there are of course observers who do not match this standard position depending on the sizes and outlines of their faces. So, the mechanism for the eye contact element according to the present embodiment is designed such that fine adjustment in the direction of the optical axis can be made before and after the standard position of FIG. 1 so as to be capable of coping with such observers as well. That is, any observer who cannot be satisfied with the standard position of FIG. 1 can slightly rotate the eye contact element 13 to thereby finely adjust the position arbitrarily. The projected portion $6a$ of the leaf spring 6 (frictional member) is always biased toward the external barrel 7 side and therefore, during the rotative operation of the eye contact element 13, it rubs against the inner peripheral surface of the external barrel 7 with a friction, and at a point of time whereat the rotative operation has been terminated, the projected portion $6a$ of the leaf spring 6 holds the eye contact element 13 in place. The state in which the projected portion $6a$ is positioned on the inner peripheral surface of the external barrel 7 is shown in FIGS. 5 and 6. The eye contact element 13 of FIG. 5 is in a slightly screwed-in state from the position of FIG. 1. FIG. 6 is a cross-sectional view taken along the line VI—VI of FIG. 5. In these two figures, the projected portion $6a$ of the leaf spring 6 is off the engagement groove $7c$ and therefore, is somewhat inferior in the force with which it is fixed at that position, as compared with the state of FIG. 1 (FIG. 2). However, the force is not so weak as to deviate the position of the external barrel 7 due to some change in the posture or orientation of the optical device and therefore does not hinder observation.

Figure 7:
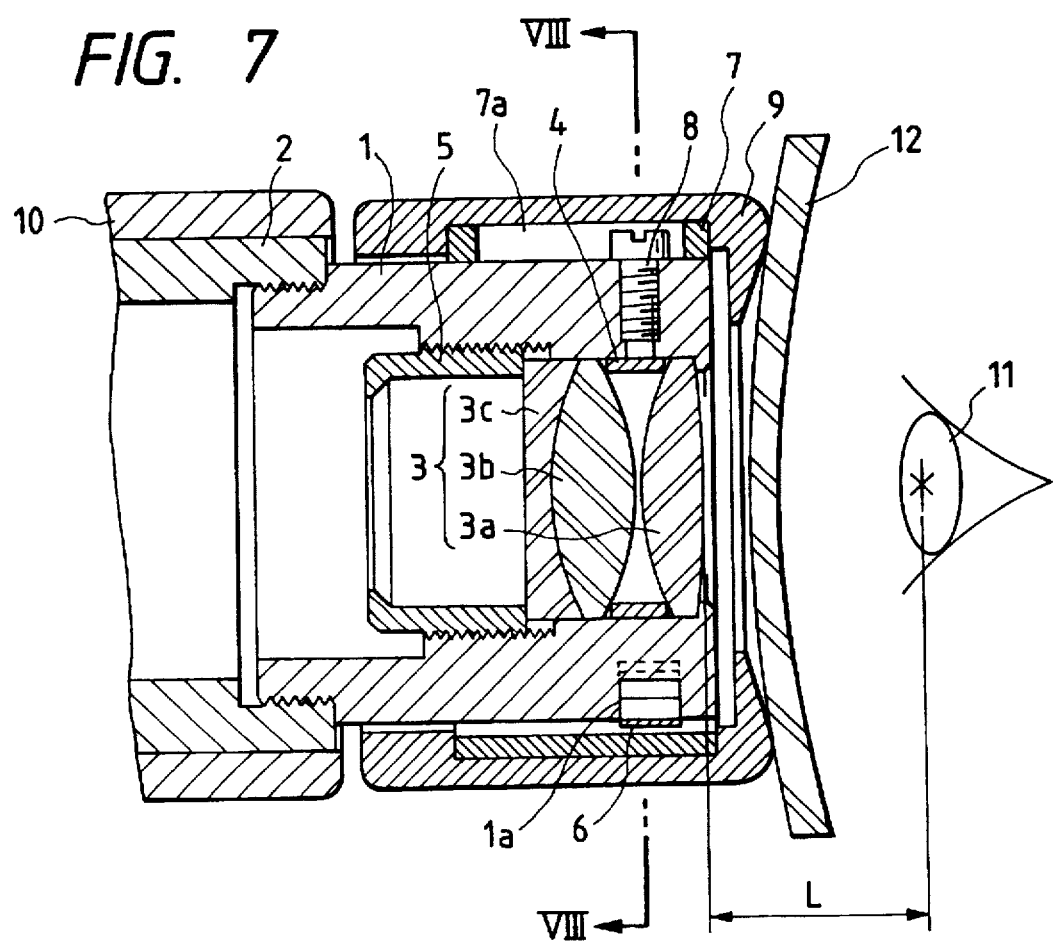
FIG. 7 is a cross-sectional view of the portion around an eye contact element in the embodiment of the present invention when the eye contact element is set at a standard position for observers wearing spectacles.
Figure 8:
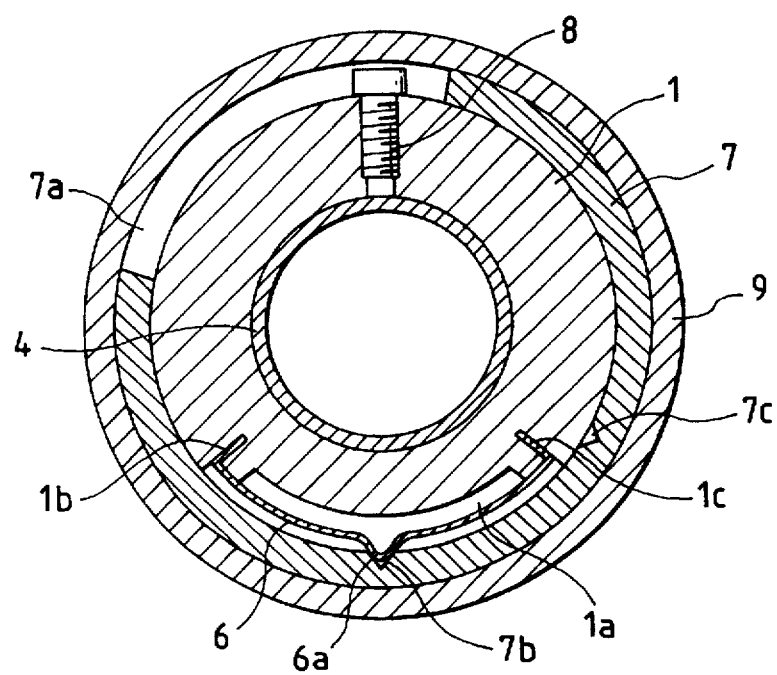
FIG. 8 is a cross-sectional view taken along the line VIII—VIII of FIG. 7.

Also, when an observer wearing a pair of spectacles uses the present optical device, he or she can rotate the eye contact element 13 to a standard position shown in FIG. 7 (a standard position for observers wearing spectacles). At this time, the cam pin 8 passes the section $7a_2$ of the cam groove $7a$. The section $7a_2$ is steeper in its inclination than the section $7a_1$ ($7a_3$) and therefore, the guide amount of the eye contact element 13 in the direction of the optical axis becomes greater than during the aforementioned fine adjustment. If this is done, the eye contact element 13 can be quickly moved from the standard position of FIG. 1 (the standard position for observers not wearing spectacles) to the standard position of FIG. 7 (the standard position for observers wearing spectacles). As can be seen from FIG. 8 which is a cross-sectional view taken along the line VIII—VIII of FIG. 7, in the standard position of FIG. 7, the projected portion $6a$ of the leaf spring 6 falls in the engagement groove $7b$. When the projected portion $6a$ of the leaf spring 6 falls into the engagement groove $7b$ or the aforedescribed engagement groove $7c$, the observer's hand feels a click and therefore, the aforedescribed two standard positions can be found out easily.

Figure 9:
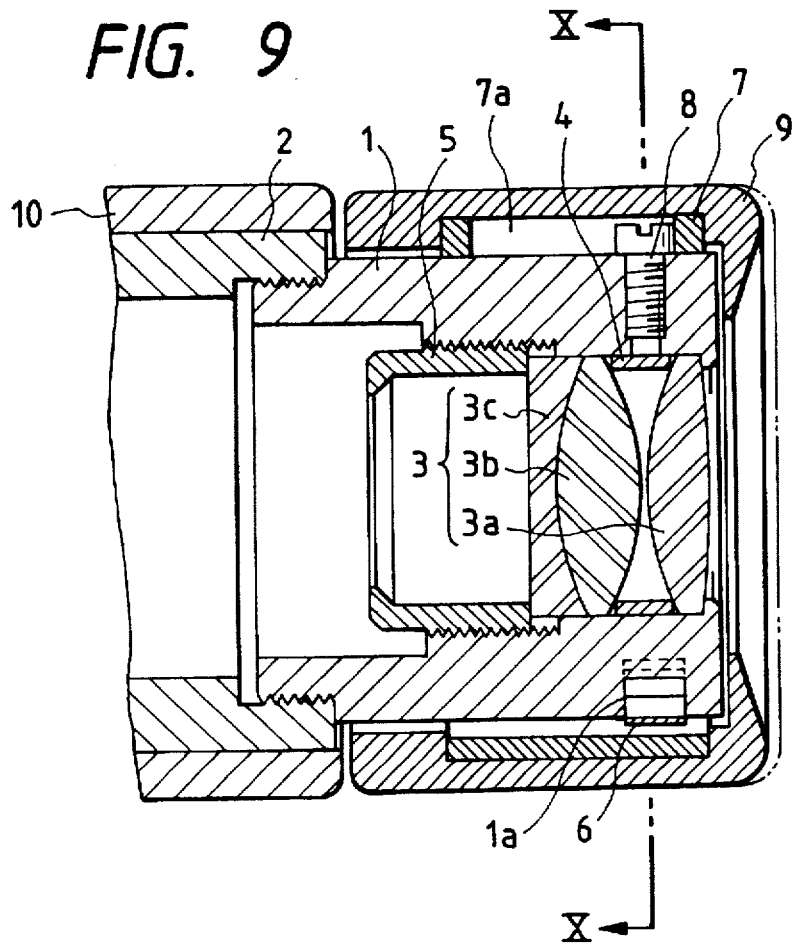
FIG. 9 is a cross-sectional view of the portion around an eye contact element in the embodiment of the present invention when the eye contact element is set near the standard position for observers wearing spectacles.
Figure 10:
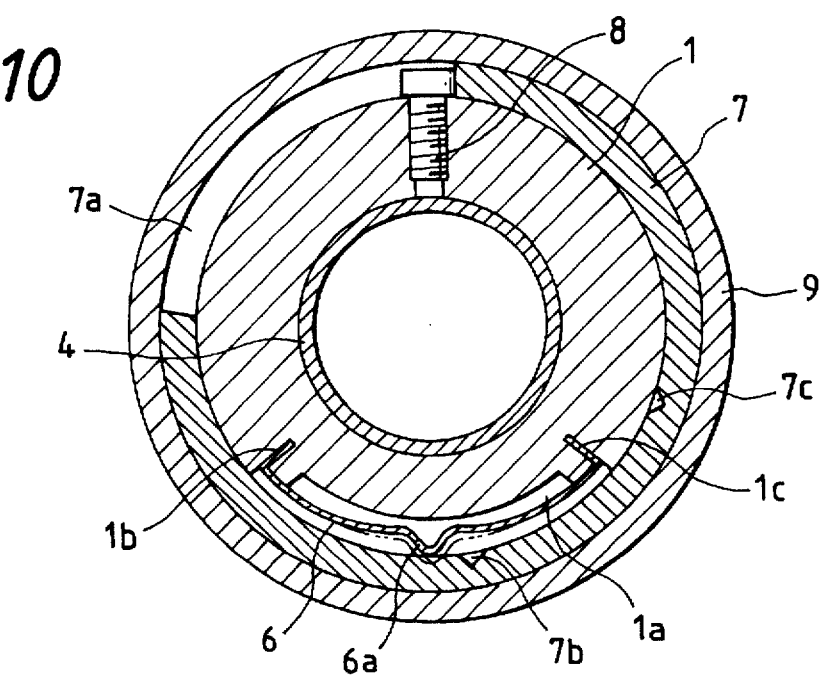
FIG. 10 is a cross-sectional view taken along the line X—X of FIG. 7.

Also, among observers wearing spectacles, there are observers who do not match the standard position of FIG. 7. In such a case, as previously described, the eye contact element 13 can be slightly rotated to thereby finely adjust the position thereof. The state in which the projected portion 6a of the leaf spring 6 is effecting positioning near the engagement groove 7b is shown in FIGS. 9 and 10. FIG. 9 shows the eye contact element 13 as it has been slightly screwed in from the position of FIG. 7, and FIG. 10 is a cross-sectional view taken along the line X—X of FIG. 9. In these two figures, the projected position 6a of the leaf spring 6 is off the engagement groove 7b and therefore it is somewhat inferior in the force with which it is fixed at that position, as compared with the state of FIG. 7 (FIG. 8), but it never happens that the position of the external barrel 7 is deviated by some change in the posture of the optical device.

As described above, according to the mechanism for the eye contact element according to the present embodiment, the positioning at the standard position for observers wearing spectacles and the standard position for observers not wearing spectacles, as well as the positioning before and after those standard positions is possible and therefore, any observer can always make observation at a proper eye point.

Figure 11:
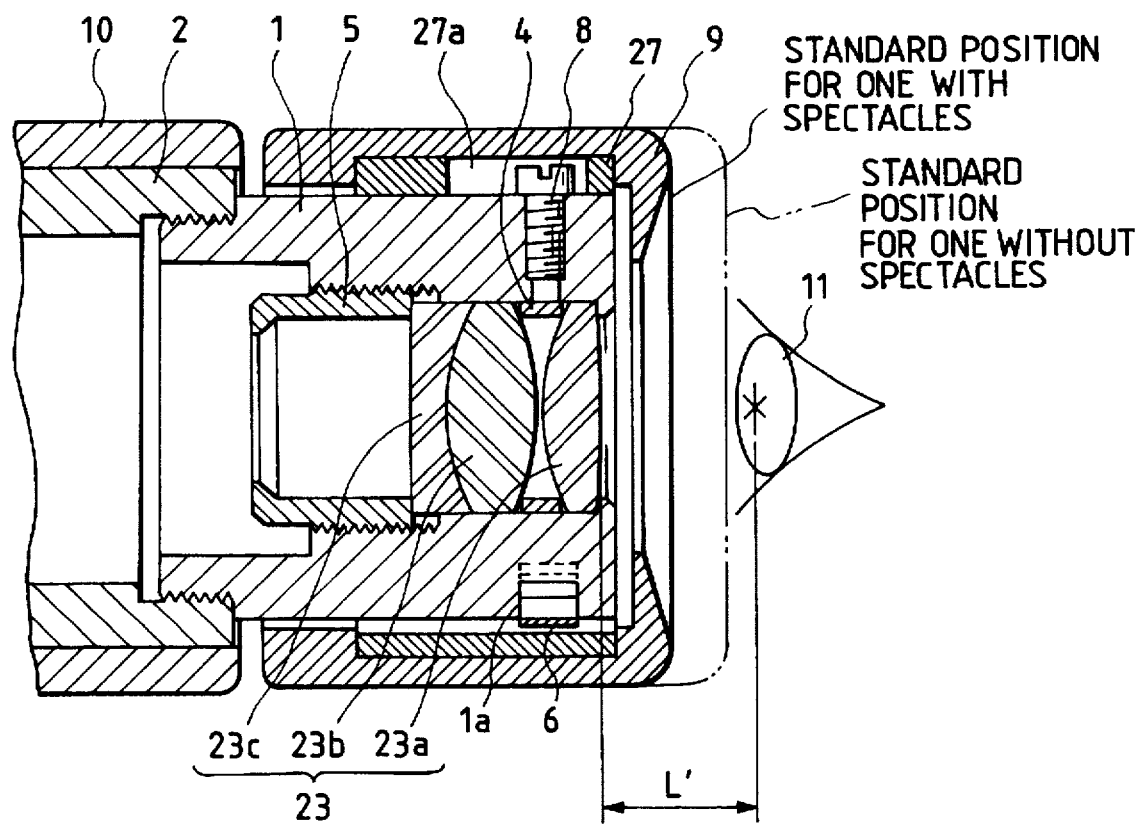
FIG. 11 is a cross-sectional view of the portion around an eye contact element according to another embodiment of the present invention.
Figure 12:
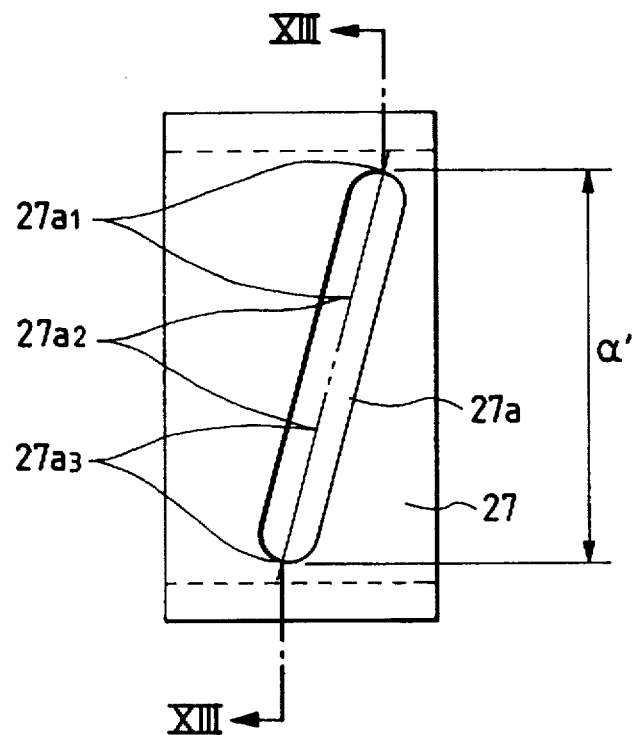
FIG. 12 is a side view of the external barrel of FIG. 11.
Figure 13:
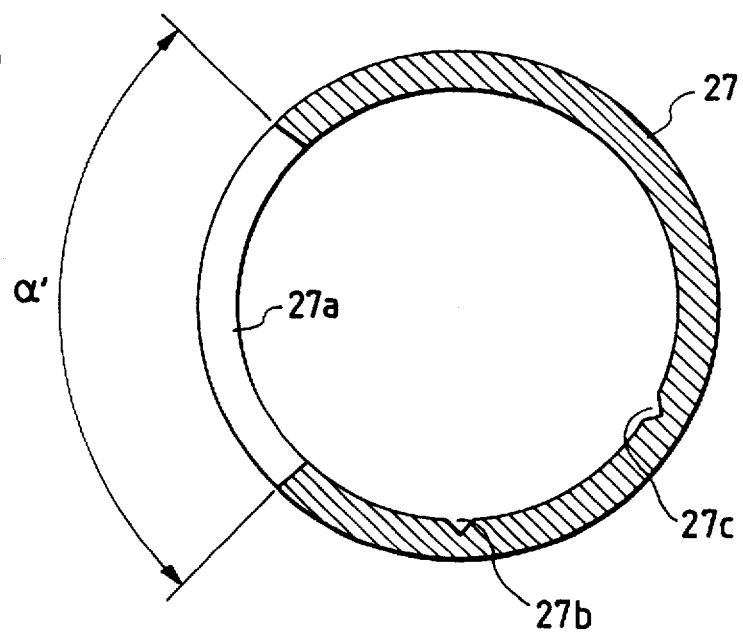
FIG. 13 is a cross-sectional view taken along the line XIII—XIII of FIG. 12.

FIGS. 11 to 13 show another embodiment of the present invention. In FIG. 11, there are shown the state of a cross-section of the eye contact element of an optical device and the position of an observer's eye. FIG. 12 is a side view of an external barrel 27. FIG. 13 is a cross-sectional view showing the cross-section XIII—XIII of the external barrel 27 of FIG. 12. In these figures, the same constituents as those used in the previous embodiment are given the same reference characters and need not be described.

In the present embodiment, the eye relief L' of an eyepiece 23 consisting of lenses 23a to 23c is shorter than the eye relief L in the previous embodiment, and in accordance therewith, the stroke of the eye contact element in the direction of the optical axis is small. Accordingly, when the rotative operation angle α' is made equal to the aforedescribed rotative operation angle α, it becomes possible to make the inclination of a cam slot 27 generally gentle, and in the present embodiment, the inclination of a section $27a_2$ is set equally to that of sections $27a_1$ and $27a_3$. The inclination of the cam slot 27a is equal to the inclination of the section $7a_1$ ($7a_3$) in the previous embodiment, and the fine adjustment of the eye contact element is possible.

The engagement groove 27c of an external barrel 27 defines a standard position for observers not wearing spectacles. Also, the engagement groove 27b of the external barrel 27 defines a standard position for observers wearing spectacles.

When the stroke of the eye contact element in the direction of the optical axis is thus small, use may be made of a cam slot having a predetermined inclination capable of being finely adjusted.

According to the present invention, the eye contact element can be moved in the direction of the optical axis while being rotated about the optical axis and therefore, the fine adjustment of the eye contact element becomes easier to do than in the prior art wherein the eye contact element has been simply moved linearly in the direction of the optical axis. Also, the eye contact element can be fixed at any position in the direction of movement thereof and therefore, anybody can make observation at a right eye point.

Also, the guide amount of the eye contact element in the direction of the optical axis per predetermined operation angle is varied, the operability of the eye contact element will be further improved.

What is claimed is:

1. A mechanism for a cylindrical eye contact element of an optical device in which said eye contact element is slidably engaged with an eyepiece holding barrel containing an eyepiece therein, comprising:

a guide mechanism to shift the eye contact element in a direction of an optical axis of said eyepiece with the rotation of said eye contact element about said optical axis when said eye contact element is rotatively operated; and a holding mechanism to hold said eye contact element at any shifted position.

2. The mechanism of claim 1, wherein said guide mechanism is a cam mechanism having a cam pin provided on one of said eyepiece holding barrel and said eye contact element, and a cam slot provided in the other of said eyepiece holding barrel and said eye contact element and in which said cam pin is inserted.

3. The mechanism of claim 2, wherein said cam slot is spirally formed and is of such a shape that a shift amount of said eye contact element in the direction of the optical axis per unit rotative operation angle is varied by an operative position of the cam pin in the cam slot.

4. The mechanism of claim 3, wherein said cam slot is of such a shape that the shift amount of said eye contact element in the direction of the optical axis per unit rotative operation angle is smaller near an end portion of the cam slot than near a center of the cam slot.

5. The mechanism of claim 2, wherein said holding mechanism includes a frictional member provided on an outer surface of said eyepiece holding barrel, biased toward an inner peripheral surface of said eye contact element, and slidable on the inner peripheral surface of said eye contact element with moderate friction when said eye contact element is rotatively operated, and said holding mechanism holds said eye contact element at any shifted position by said friction between said frictional member and the inner peripheral surface of said eye contact element.

6. The mechanism of claim 5, wherein the inner peripheral surface of said eye contact element is formed with an engagement groove engaged by said frictional member when said cam pin is positioned at a predetermined location in said cam slot.

7. The mechanism of claim 6, wherein said engagement groove is formed at such a location as to be engaged by said frictional member when said cam pin is positioned near the end portion of said cam slot.

8. The mechanism of claim 6, wherein the inner peripheral surface of said eye contact element is formed with another engagement groove, said engagement groove being formed at such a location as to be engaged by said frictional member when said eye contact element is positioned at a first standard position suitable when an observer wearing a pair of spectacles looks into the eyepieces and said another engagement groove being formed at such a location as to be engaged by said frictional member when said eye contact element is positioned at a second standard position suitable when an observer not wearing a pair of spectacles looks into the eyepiece.

9. The mechanism of claim 1, wherein a shift range of said eye contact element includes at least a first standard position suitable when an observer wearing a pair of spectacles looks into the eyepiece and a second standard position suitable when an observer not wearing a pair of spectacles looks into the eyepiece, and said mechanism for said eye contact element is further provided with a positioning mechanism for positioning said eye contact element near said first standard position and said second standard position.

10. The mechanism of claim 9, wherein said holding mechanism includes a frictional member provided on an outer surface of said eyepiece holding barrel, biased toward an inner peripheral surface of said eye contact element, and slidable on the inner peripheral surface of said eye contact element with moderate friction when said eye contact element is rotatively operated, said holding mechanism holds said eye contact element at any shifted position by said friction between said frictional member and the inner peripheral surface of said eye contact element, and said positioning mechanism includes first and second engagement grooves formed in the inner peripheral surface of said eye contact element and engaged by said frictional member when said eye contact element is in said first and said second standard positions, respectively.

11. The mechanism of claim 10, wherein an operator feels a click when said frictional member is engaged with said first and said second engagement grooves.

12. The mechanism as claimed in claim 1, wherein said holding mechanism includes biasing means formed on an outer surface of said eyepiece holding barrel and biased toward an inner peripheral surface of said eye contact element, said biasing means frictionally sliding along the inner peripheral surface of said eye contact element as said eye contact element is rotatively operated, to hold said eye contact element at any shifted position along said optical axis.

13. The mechanism as claimed in claim 12, wherein:
said eyepiece holding barrel has slit grooves; and
said biasing means is a spring which has portions to fit in said slit grooves, to maintain said spring in a fixed position relative to said eyepiece holding barrel.

14. The mechanism as claimed in claim 13, wherein:
said eyepiece holding barrel has a circumferential groove; and
said spring is formed over said circumferential groove, to allow said spring to be deformed within said circumferential groove due to contact with the inner peripheral surface of said eye contact element.

15. The mechanism as claimed in claim 4, wherein said holding mechanism includes biasing means formed on an outer surface of said eyepiece holding barrel and biased toward an inner peripheral surface of said eye contact element, said biasing means frictionally sliding along the inner peripheral surface of said eye contact element as said eye contact element is rotatively operated, to hold said eye contact element at any shifted position along said optical axis.

16. The mechanism as claimed in claim 8, wherein:
said eyepiece holding barrel has slit grooves; and
said frictional member is a spring which has portions to fit in said slit grooves, to maintain said spring in a fixed position relative to said eyepiece holding barrel, and a projected portion to engage said engagement groove when said eye contact element is at said first standard position and to engage said another engagement groove when said eye contact element is at said second standard position.

17. The mechanism as claimed in claim 16, wherein:
said eyepiece holding barrel has a circumferential groove; and
said spring is formed over said circumferential groove, to allow said spring to be deformed within said circumferential groove due to contact with the inner peripheral surface of said eye contact element.

18. The mechanism as claimed in claim 9, wherein said holding mechanism includes biasing means formed on an outer surface of said eyepiece holding barrel and biased toward an inner peripheral surface of said eye contact element, said biasing means frictionally sliding along the inner peripheral surface of said eye contact element as said eye contact element is rotatively operated, to hold said eye contact element at any shifted position along said optical axis.

19. A mechanism for a cylindrical eye contact element of an optical device in which said eye contact element is engaged with an eyepiece holding barrel containing at least one lens, said mechanism comprising:
a guide mechanism to shift the eye contact element in a direction of an optical axis of said at least one lens upon a rotation of said eye contact element about said optical axis, to adjust an eye relief amount between an eye of an observer at an end of said eye contact element and a closest one of said at least one lens to the eye; and
a holding mechanism to hold said eye contact element at any shifted position.

* * * * *

UNITED STATES PATENT AND TRADEMARK OFFICE
CERTIFICATE OF CORRECTION

PATENT NO. : 5,784,207
DATED : July 21, 1998
INVENTOR(S) : Akira Satoh

It is certified that error appears in the above-identified patent and that said Letters Patent is hereby corrected as shown below:

Column 6, line 53, claim 8, change "eyepieces" to -- eyepiece, --.

Signed and Sealed this

Fifteenth Day of December, 1998

Attest:

BRUCE LEHMAN

*Attesting Officer*        *Commissioner of Patents and Trademarks*